Aug. 18, 1931.     T. J. HILE ET AL     1,819,955
CONVEYER
Filed Oct. 17, 1929     2 Sheets-Sheet 2
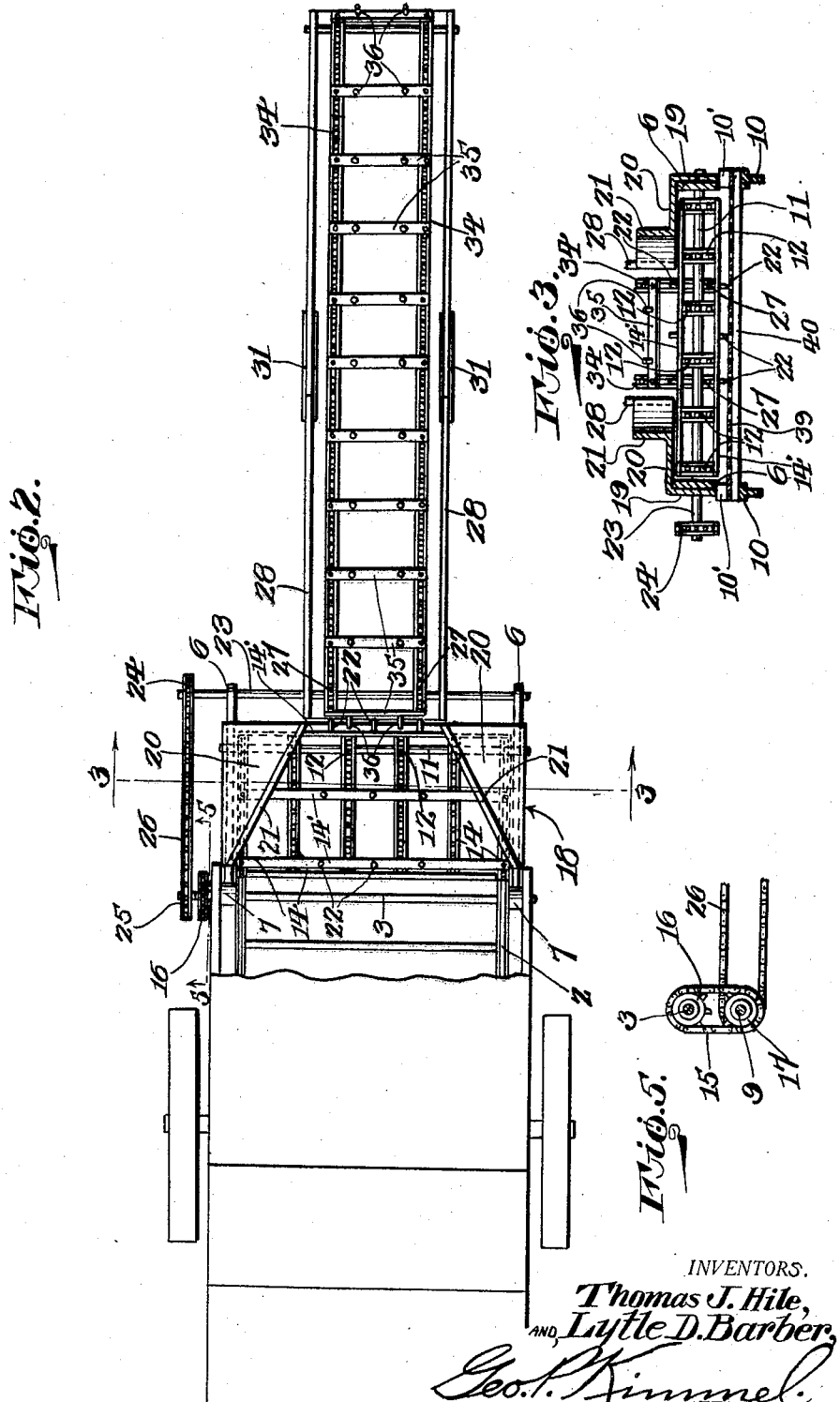
INVENTORS.
Thomas J. Hile,
AND Lytle D. Barber.
Geo. P. Kimmel
ATTORNEY.

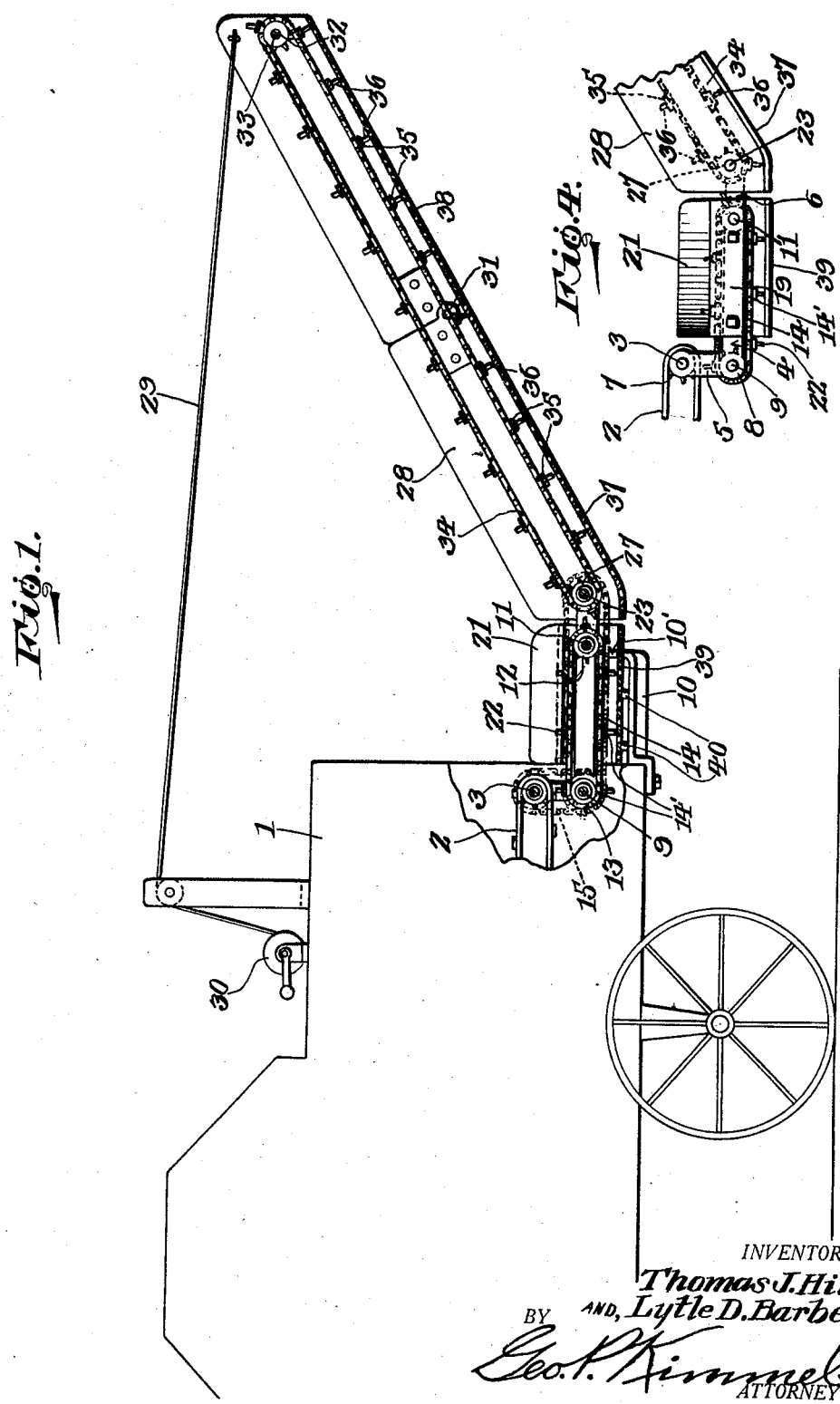

Patented Aug. 18, 1931

1,819,955

UNITED STATES PATENT OFFICE

THOMAS J. HILE, OF IRON CITY, AND LYTLE D. BARBER, OF CLIMAX, GEORGIA

CONVEYER

Application filed October 17, 1929. Serial No. 400,371.

This invention relates to a conveyer particularly adapted for use in connection with a peanut picker, and has for one of its objects to provide, in a manner as hereinafter set forth, a means for automatically taking the hay from a peanut picker and delivering the hay at a point removed from the picker, thereby effecting a material saving in labor which is usually required to prevent the hay from piling up at its point of discharge from the picker.

A further object of the invention is to provide a device for the purpose aforesaid which is constructed in a manner to catch all the hay as the latter is discharged from the picker and to deliver the hay in a relatively thin stream at a point removed from the picker whereby the hay may be conveniently baled or sacked.

A further object of the invention is to provide a conveyer as aforesaid having associated therewith means for freeing the hay carried thereby from dirt, sand, and the like, whereby the hay may be delivered from the conveyer in a relatively clean condition.

With the foregoing and other objects in view, the invention consists of the novel construction, combination and arrangement of parts as hereinafter more specifically described, and as illustrated in the accompanying drawings, wherein is shown an embodiment of the invention, but it is to be understood that the description and drawings are to be taken as illustrative, and that the invention is intended to be limited only by the scope of the claims hereunto appended.

In the accompanying drawings in which like numerals are employed to designate like parts throughout the same:—

Figure 1 is a vertical section through a conveyer in accordance with his invention, showing the same in association with a peanut picker conventionally shown in side elevation and partly broken away.

Figure 2 is a top plan thereof.

Figure 3 is a section taken on line 3—3 of Figure 2.

Figure 4 is a fragmentary elevation showing the means for mounting the conveyer on the picker.

Figure 5 is a section taken on line 5—5 of Figure 2.

Referring to the drawings in detail, the numeral 1 designates a peanut picker having the usual endless carrier 2 for discharging the vines from the picker after the peanuts have been removed therefrom. The carrier 2 is mounted at its rearward end on a shaft 3 which is suitably journaled in the frame of the picker 1.

Rotatably mounted on the shaft 3, adjacent each side of the picker, is a substantially L-shaped supporting member 4 which consists of a short vertical arm 5 and a relatively long, horizontal arm 6. At the upper ends thereof, the arms 5 are formed with bosses 7 through which the shaft 3 extends. At the point of mergence between the arms 5 and 6, each of the supporting members 4 is formed with a boss 8 through which a shaft 9 extends, the bosses 8 providing bearings for the shaft 9. Projecting rearwardly from the picker is a pair of brackets 10, each of which is formed at its rearward end with an upwardly extending nose 10' which bears against the lower face of a supporting member 4, by means of which the supporting members are maintained with the arm 6 disposed substantially horizontally.

Extending between the arms 6 is a shaft 11, the ends of which are journaled in the arms 6 in spaced relation to the rearward ends of the latter. Fixedly mounted on the shaft 11 is a plurality of spaced sprockets 12 and in alignment with the sprockets 12, longitudinally of the picker, is a plurality of spaced sprockets 13 fixedly mounted on the shaft 9. Mounted on each of the aligned sprockets 13 and 12 is an endless chain 14. The chains 14 are connected together by means of a plurality of spaced bars 14' and in conjunction therewith constitute a carrier extending rearwardly from the picker. The carrier thus formed by the chains 14 and bars 14' is driven by means of an endless chain 15 carried by a pair of sprockets 16 and 17 respectively mounted on the shafts 3 and 9.

Secured to each of the supporting members 4 is a guard 18 consisting of a vertical portion 19 secured to the arms 6, a horizontal portion 20 extending inwardly from the upper edge of the vertical portion 19, and a vertical portion 21 extending upwardly from the inner edge of the horizontal portion 20. The horizontal portion 20 is triangular in shape whereby the vertical portions 21 converge in a rearward direction. The guards 18 are arranged with respect to the chains 14 so that the center-most of the latter are disposed wholly between the guards 18, while the remaining chains 14 pass under the guards 18 for a portion of their length. Throughout a centrally disposed portion of its length, each of the bars 14' is provided with a plurality of spaced spikes 22.

Extending through the arms 6, adjacent the rearward ends of the latter, is a shaft 23, upon one end of which is fixedly mounted a sprocket 24. Mounted on the sprocket 24 and also on a sprocket 25 fixedly mounted on the shaft 9 is a chain 26 by means of which the shaft 23 is rotated upon the rotation of the shaft 9. Fixedly mounted on the shaft 23 is a pair of spaced sprockets 27.

Pivoted on the shaft 23 is a pair of spaced guards 28 which extend rearwardly from the rearward ends of the vertical portions 21 of the guards 18. The guards 28 are supported at their rearward ends on a cable 29, the forward end of which is secured to a windlass 30 mounted on the picker 1. Intermediate its ends, each of the guards 28 is formed with a hinge 31 whereby the guards may be folded if desired.

Extending between the guards 28, adjacent the rearward ends thereof, is a shaft 32, upon which is fixedly mounted a pair of spaced sprockets 33 which are arranged in alignment with the sprockets 27 mounted on the shaft 23. Carried by each of the aligned sprockets 27 and 33 is an endless chain 34. The chains 34 are connected together by means of a plurality of spaced bars 35, each of which is provided with a plurality of spaced spikes 36 similar to the spikes 22 formed on the bars 14' and arranged in staggered relation with respect to the spikes 22. The chains 34, and bars 35 constitute a carrier of materially less width than the carrier constituted by the chains 14 and bars 14'.

Secured to and extending between the guards 28, adjacent the lower edges of the latter, is a perforated bottom member 37 which is of a length to extend from the forward edges of the guards 28 to the hinges 31. Secured to the guards 28 is a similar bottom member 38 which extends from the hinges 31 to the rearward edges of the guards 28. The carrier constituted by the chains 14 and bars 14' is also provided with a perforated bottom member 39 which is seated on a plurality of cross members 40 carried by the brackets 10.

When the picker is in operation, the carrier 2 is rotated in a clockwise direction as viewed in Figure 1 whereby the hay from which the peanuts have been stripped is deposited on the carrier constituted by the endless chains 14 and bars 14'. Owing to the chains 15 connected with the shafts 3 and 9 by means of the sprockets 16 and 17, the carrier constituted by the chains 14 and bars 14' is operated simultaneously with the carrier 2. The spikes 22 on the bars 14' pull the hay clear from the carrier 2 and carry the same in a rearward direction where it is caught by the spikes 36 on the bars 35. Owing to the converging inclination of the vertical portions 21 of the guards 18, the hay is worked from both sides towards the center for disposition on the carrier extending rearwardly from the guards 18. Thus it will be seen that a conveyer is provided, the forward end of which is sufficiently wide to catch all the hay being discharged from the picker and the rearward end of which is sufficiently narrow to deliver the hay in a concentrated stream.

Owing to the staggered relation of the spikes 36 with respect to the spikes 22, it is necessary to space the carrier constituted by the chains 34 and bars 35 from the carrier constituted by the chains 14 and bars 14' only a sufficient distance to provide a clearance between the forward extremity of the path of travel of the bars 35 and the rearward extremity of the path of the bars 14'. The forward extremity of the path of travel of the spikes 36 overlaps the rearward extremity of the path of travel of the spikes 22 whereby a clean transfer of the hay from the wide carrier to the narrow carrier is assured. In the travel of the hay on the carriers, the hay is agitated by the bars 14' and 35 whereby sand and the like is removed from the hay and permitted to fall through the perforated bottom members 39, 37 and 38. Any hay which falls between the bars is retained by the perforated bottom members.

Owing to the pivotal mounting of the supporting members 4 on the shaft 3, the pivotal mounting of the guards 28 on the shaft 23, and the hinges 31 provided centrally of the guards 28, the conveyer may be conveniently folded when not in operation to permit the same to be expeditiously moved with the picker.

Although by way of example only one set of hinges 31 is shown for the guards 28 whereby the narrow carrier is divided into a pair of hinged sections, it is to be understood that the length of the guards may be increased and additional sets of hinges provided, or the length of the guards may be decreased and the hinges omitted, thereby providing a carrier having as many sections as the exigencies of any particular set of circumstances may require, according to the type of machine with which the conveyer is associated and the position of the machine relative to the point of discharge of the hay from the conveyer.

It is thought that the many advantages of a conveyer in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What we claim is:

1. In a peanut picker having a hay discharge carrier mounted on a shaft, a pair of L-shaped supports pivotally mounted on the shaft, a wide endless carrier mounted on the supports, a pair of rearwardly converging guards disposed over the wide carrier, a narrow endless carrier supported at its forward end on said supports, and spaced parallel guards disposed over the narrow carrier and extending rearwardly from the guards over the wide carrier.

2. In a peanut picker having a hay discharge carrier mounted on a shaft, a pair of L-shaped supports pivotally mounted on the shaft, a wide endless carrier mounted on the supports, a pair of rearwardly converging guards disposed over the wide carrier, a narrow endless carrier supported at its forward end on said supports, spaced parallel guards disposed over the narrow carrier and extending rearwardly from the guards over the wide carrier, said wide and narrow carriers each including a plurality of spaced endless chains and further including a plurality of spaced bars connecting the chains together, spaced spikes on the bars of the narrow carrier, and spaced spikes on a centrally disposed portion of each bar of the wide carrier, the spikes of the narrow carrier being arranged in staggered relation to the spikes of the wide carrier.

3. In a peanut picker having a hay discharge carrier mounted on a shaft, supporting means pivotally mounted on the shaft, a wide endless carrier mounted on said supporting means, and a narrow endless carrier having its forward end disposed adjacent the rearward end of the wide carrier and pivotally connected with said supporting means.

In testimony whereof, we affix our signatures hereto.

THOMAS J. HILE.
LYTLE D. BARBER.